A. A. OLIVER.
FRICTIONAL PAWL.
APPLICATION FILED OCT. 1, 1912.
1,142,452.
Patented June 8, 1915.
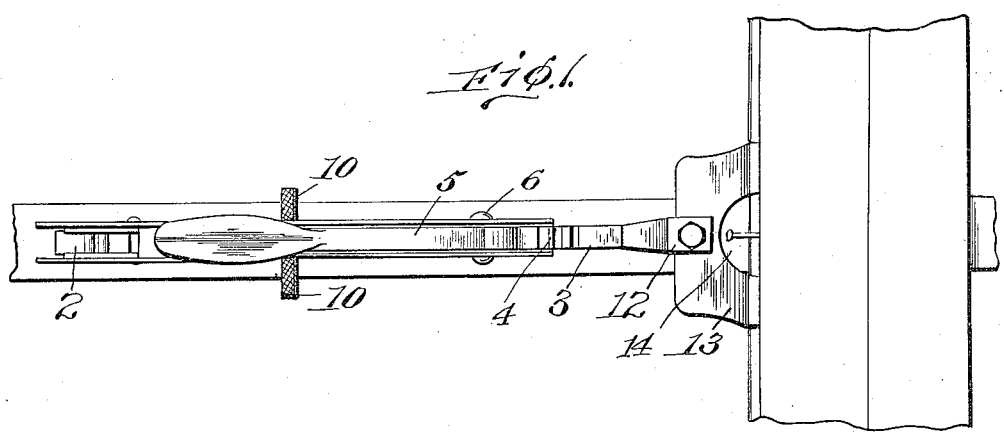
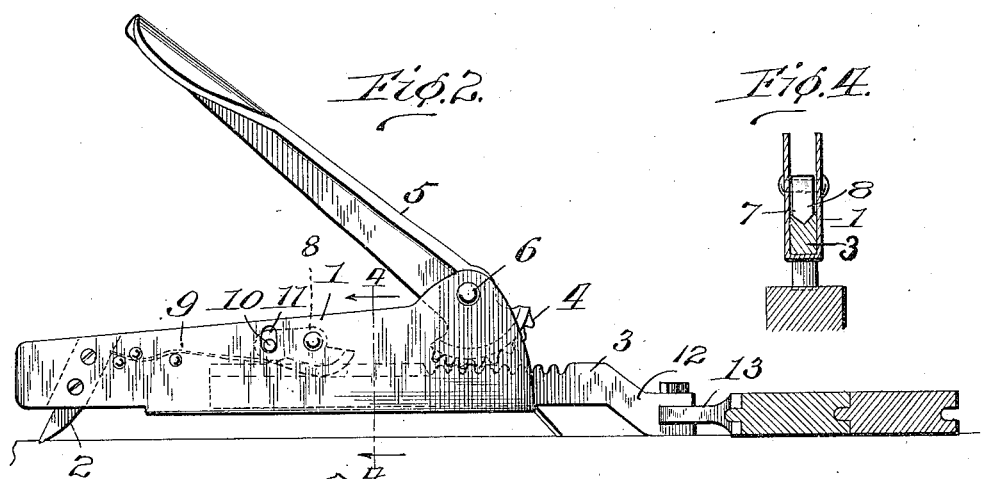
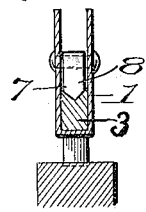
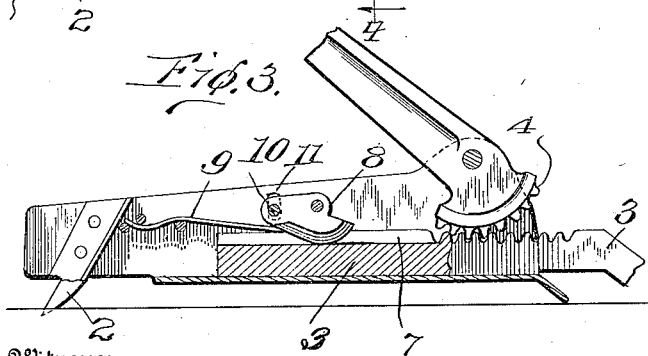
Inventor
Arthur A. Oliver.
Witnesses
By
Attorney

UNITED STATES PATENT OFFICE.

ARTHUR A. OLIVER, OF CALERA, ALABAMA.

FRICTIONAL PAWL.

1,142,452. Specification of Letters Patent. Patented June 8, 1915.

Application filed October 1, 1912. Serial No. 723,397.

*To all whom it may concern:*

Be it known that I, ARTHUR A. OLIVER, a citizen of the United States, residing at Calera, in the county of Shelby and State of Alabama, have invented new and useful Improvements in Frictional Pawls, of which the following is a specification.

This invention relates to floor clamps and the object of the invention is to provide a simple and efficient device of this character by which the flooring boards may be clamped in position for mailing.

A further object of the invention is to provide a device of this character having a pivoted horizontally movable head which enables the operator to use the device upon boards having a diagonal position with relation to the joists.

Further objects of this invention will appear as the following specific description is read in connection with the accompanying drawing, which forms a part of this application, and in which:—

Figure 1 is a top plan view. Fig. 2 is a side elevation. Fig. 3 is a detail longitudinal sectional view. Fig. 4 is a transverse sectional view taken on the line 4—4 of Fig. 2.

Referring more particularly to the drawing, 1 represents a channel bar which has secured between the sides thereof at one end a diagonally positioned joist engaging spike 2 adapted to drive into the joist so as to hold the bar against longitudinal movement thereover. Slidably mounted in the channel bar is a rack bar 3 which is operated by means of a rack segment 4 formed on the end of the operating lever 5 pivoted between the sides of the angle bar 1, here shown at 6. The rear end of the bar is provided with a substantially V-shaped groove 7 on its upper face which is engaged by the friction clutch or dog 8 pivoted between the sides of the bar 1 and having its rear end engaged by a spring 9 which normally throws the forward end downwardly into engagement with the groove.

The dog carries suitable transverse arms 10 which extend through slots in the sides of the bar 1 so that the dog may be thrown to inoperative position, as will be readily understood, to release the bar 3 when it is desired to move the same back into the bar 1.

The forward end of the bar 3 is provided with a depressed bifurcated end 12 in which is pivoted for horizontal movement a plank or flooring engaging head 13 bifurcated to produce a nailing space 14, as shown. By pivoting the head in this manner, the device may be operated upon flooring boards which are arranged diagonally to the line of the joists as will be readily understood. When the rack bar is moved forwardly to carry the head into engagement with the plank, the dog slides idly in the groove but when the lever is released, the spring 9 will force the dog into such firm frictional engagement with the groove in the bar 3, that the same is held in adjusted position, as will be readily understood.

What is claimed is:—

In a device of the class described, a support and bar slidably mounted upon the support and having a V-shaped groove in its upper surface, a dog pivoted to the support, the body of the dog being elongated and pivoted near its forward end, the upper edge being parallel to the bar when the dog is in engagement therewith, the lower edge inclining downwardly and being rounded at its forward end to form a cam surface being shaped and adapted to fit in the groove in the bar, a spring engaging the lower side of the dog at the rear end thereof to normally hold the dog in engagement with the bar, laterally extending arms carried by the dog at the rear end thereof, said arms extending through slots in the support to allow the dog to be thrown out of engagement with the bar, and means for operating the bar over the support.

In testimony whereof I affix my signature in presence of two witnesses.

ARTHUR A. OLIVER.

Witnesses:
J. L. STALLWORTH,
Z. S. COWART.

Copies of this patent may be obtained for five cents each, by addressing the "Commissioner of Patents, Washington, D. C."